(12) United States Patent
Nakamoto et al.

(10) Patent No.: US 6,879,836 B2
(45) Date of Patent: Apr. 12, 2005

(54) LOCATION MANAGEMENT METHOD AND APPARATUS FOR MANAGING A LOCATION OF A GPS-EQUIPPED PORTABLE TELEPHONE CARRIED BY A MEMBER

(75) Inventors: Yusho Nakamoto, Hatsukaichi (JP); Tomio Muneishi, Hiroshima (JP); Tsuyoshi Aoki, Hatsukaichi (JP)

(73) Assignee: Juken Sangyo Co., Ltd., Hiroshima (JP)

( * ) Notice: Subject to any disclaimer, the term of this patent is extended or adjusted under 35 U.S.C. 154(b) by 0 days.

(21) Appl. No.: 10/200,964

(22) Filed: Jul. 23, 2002

(65) Prior Publication Data

US 2003/0022676 A1 Jan. 30, 2003

(30) Foreign Application Priority Data

Jul. 26, 2001 (JP) ....................................... 2001-226856

(51) Int. Cl.[7] .......................... H04Q 7/20; G08G 1/123; G01S 3/02; G01C 21/26
(52) U.S. Cl. ............................... 455/456.2; 455/456.5; 455/457; 340/995.18; 340/995.14; 340/991; 340/993; 340/994; 342/357.07; 342/357.08; 342/357.09; 342/357.13; 342/457; 701/204; 701/208; 701/213
(58) Field of Search ........................ 340/995.14, 995.1, 340/991, 992, 994, 998, 989, 990, 995.18, 993; 455/456.2, 456.1, 456.5, 456.6, 457, 517, 414.1, 414.2; 701/200, 201, 204, 206, 207, 208, 213, 209, 210; 342/357.01, 357.06, 357.07, 357.08, 357.09, 357.1, 357.12, 357.13, 450, 457

(56) References Cited

U.S. PATENT DOCUMENTS

| | | | |
|---|---|---|---|
| 5,638,077 A | 6/1997 | Martin | 342/457 |
| 6,169,955 B1 | 1/2001 | Fultz | 701/200 |
| 6,202,023 B1 | 3/2001 | Hancock et al. | 701/201 |
| 6,411,891 B1 * | 6/2002 | Jones | 342/357.07 |
| 6,741,927 B1 * | 5/2004 | Jones | 455/456.2 |
| 6,748,318 B1 * | 6/2004 | Jones | 701/204 |
| 6,748,320 B1 * | 6/2004 | Jones | 340/994 |
| 6,763,299 B1 * | 7/2004 | Jones | 701/204 |
| 6,763,300 B1 * | 7/2004 | Jones | 701/204 |
| 6,804,606 B1 * | 10/2004 | Jones | 701/213 |
| 2003/0146854 A1 * | 8/2003 | Jones | 340/994 |
| 2003/0195696 A1 * | 10/2003 | Jones | 701/204 |
| 2003/0195697 A1 * | 10/2003 | Jones | 340/994 |
| 2003/0195698 A1 * | 10/2003 | Jones | 340/994 |
| 2003/0195699 A1 * | 10/2003 | Jones | 340/994 |
| 2003/0233188 A1 * | 12/2003 | Jones | 701/200 |
| 2003/0233190 A1 * | 12/2003 | Jones | 340/993 |

FOREIGN PATENT DOCUMENTS

| | | | | |
|---|---|---|---|---|
| JP | 3-171932 | * | 7/1991 | ............ H04B/7/26 |
| JP | 8-305995 | * | 11/1996 | ............ H04B/7/24 |
| JP | 8-315291 | * | 11/1996 | ............ H04B/7/26 |
| JP | 10-260994 | | 9/1998 | ............ G06F/17/40 |
| JP | 10-281801 | * | 10/1998 | ............ G01C/21/00 |
| JP | 2001-141478 | * | 5/2001 | ............ G01C/21/00 |

* cited by examiner

Primary Examiner—Rafael Perez-Gutierrez
(74) Attorney, Agent, or Firm—McGlew and Tuttle, P.C.

(57) ABSTRACT

A location management method manages the location of a member which move around carrying a GPS-equipped portable telephone. The method includes inquiring of the GPS-equipped portable telephone about its current location, making the GPS-equipped portable telephone return positional information of the current location measured by the GPS function, managing the returned positional information of the current location in a file, searching a map database based on the positional information of the current location, and preparing and displaying map data linked with the positional information of the current location.

1 Claim, 11 Drawing Sheets

| 1. DELIVERY PLAN | DEALER A ⟶ DEALER B ⟶ DEALER C |
|---|---|
| 2. DISTANCE | DEALER A ⟷ DEALER B ⟷ DEALER C<br>　　　　　　　10Km　　　　　　　　7Km |
| 3. DELIVERY PERFORMANCE | DEALER A　　　　　DEALER B　　　　　DEALER C<br>ARRIVAL TIME　　ARRIVAL TIME<br>DEPARTURE TIME　DEPARTURE TIME |
| 4. CURRENT LOCATION | DEALER A　　　　　DEALER B　　　　　DEALER C<br>LOADING　TRAVELING |
| 5. VOLUME AND WEIGHT | DEALER A　　　　　DEALER B　　　　　DEALER C<br>VOLUME　　　　　　VOLUME<br>WEIGHT　　　　　　WEIGHT |
| 6. AVERAGE SPEED<br>7. VICS TRAFFIC CONGESTION INFORMATION | |

MAP IMAGE WITH POSITIONAL INFORMATION MARKED

FIG. 11B

MAP IMAGE WITH TRAVEL PATH DISPLAYED AS A LINE

LOCATION MANAGEMENT METHOD AND APPARATUS FOR MANAGING A LOCATION OF A GPS-EQUIPPED PORTABLE TELEPHONE CARRIED BY A MEMBER

BACKGROUND OF THE INVENTION

1. Field of the Invention

This invention relates to a location management method and apparatus, and more particularly to a location management method and apparatus for obtaining, managing, and thereby allowing efficient use of, information about the location of people who go the rounds changing their location every moment.

2. Description of the Related Art

Regarding mobile workers such as sales people, service people, and delivery people who are on the road changing their location every moment, it is often necessary to know, record, and log their location in order to make urgent inquiries or emergency contacts, predict arrival times, or prepare daily reports. There are not a few cases in which it is desired to know the exact location of a customer calling from the road. The present invention provides a useful location management measures in such cases.

Conventionally, most companies do not systematically manage the activities of field staff such as customer service (CS) personnel who perform on-site service in response to user complaints, sales personnel who advertise and sell products, and delivery personnel who deliver products. The following is a typical example of operations management for customer service (CS) personnel, sales personnel, and delivery personnel in a building material manufacturer.

[1] Example of operations management for customer service (CS) personnel:
(1) The sales department or quality control department of a company receives a customer's complaint about a product. (2) The department assesses the state of quality control and calls the CS person who is likely to be the nearest to the building site of the customer on a portable telephone (or mobile telephone) based on an operations schedule of CS people. (3) The department checks the current location of the called CS person by phone. (4) The department judges whether the CS person can go to the site of the customer who made the complaint. If he/she can, the department instructs him/her to do so. (5) The travel to the customer's site is left up to the CS person, who goes to the site, keeping in touch with the sales depatment. (6) The CS person prepares a daily report at the end of the day. If the CS person is on a business trip, he/she faxes the daily report to the quality control department from a hotel. It is often the case that a CS person submits daily reports for the past week or the like all at one time when he/she goes to the office.

[2] Example of operations management for sales personnel:
(1) The sales department of a company receives a request from a customer to send samples of building material urgently. (2) The department informs a sales representative on the go about the matter by phone. (3) If the sales representative can go to the customer's site, he/she is asked to take samples. If he/she cannot, the samples will be delivered to the customer later. (4) When coming back to the office from a day's outside work, the sales representative prepares and submit a daily report. Depending on the location, it will take some days for the sales representative to return to the office. In that case, the daily report will be submitted later.

[3] Example of operations management for delivery personnel:
(1) For delivery of ordered goods to a building site, the customer is asked to fax the address and a map of the new building. (2) The sales department or a product center registers the object by entering its address in a host computer. (3) The map is faxed further to the physical distribution department to confirm the site address. (4) The host computer has registered average arrival time in a customer master of each customer to answer inquiries about delivery time. (5) After a delivery truck leaves the office, the company loses track of it.

The examples of operations management for customer service (CS) personnel, sales personnel, and delivery personnel described above have the following problems.

[1] Problems in relation to customer service (CS) personnel:
(1) The quality control department does not know the current location of CS personnel. There is often no operations schedule. Even if there is, the operations schedule is not always followed. (2) The quality control department does not keep track of CS personnel's daily activities. (3) It is troublesome to describe a day's activities of a CS person in detail in a daily report. (4) There is no point in receiving a week's daily reports all at one time. There may be matters that require immediate attention. (5) Daily reports sometimes do not reach the quality control department.

[2] Problems in relation to sales personnel:
(1) Since the current locations of sales people are unknown, there is no way to know who is nearest to a customer who has an urgent business matter. Consequently, the customer will be inconvenienced by a delay in response. (2) Currently, most of daily reports do not contain temporal information. Consequently, there is no way to know how a sales person moved around during a given day, how many minutes he/she spent visiting each customer, and whether there were wasteful movements or actions. (3) In the case of on-site delivery, a site address is essential and will take some time and labor to enter. If a map is transmitted by fax, it may turn out to be unreadable, resulting in a delayed delivery. This in turn may delay the field work, incurring extra expenses.

[3] Problems in relation to delivery personnel:
(1) Delivery time varies with the number of deliveries to be made on that day, delivery route, road conditions, and various other factors. In most cases, delivery time is estimated based on the average of past data and is prone to error. However, the customer such as a construction contractor makes arrangements for carpenters and vehicles. Therefore, if goods are not delivered on time, the arrangements may incur waste and there may be a delay in construction time. The delayed construction time will involve a penalty and thus cause inconvenience to the customer. (2) If arrival is delayed due to a truck accident or breakdown during transportation, it may sometimes be necessary to arrange for another truck and reload the goods. However, it may take time to find the current location of the delivery truck and send the replacement truck. (3) There is no way of knowing when goods were actually delivered to customers. Besides, it is not possible to tell whether the delivery routes (roads) used are the shortest routes because they are left up to truck drivers.

SUMMARY OF THE INVENTION

The object of the present invention is to provide a location management method and apparatus for obtaining, managing and making use of, constantly or as required, information about the location of sales people, service people, delivery people, and other people who are on the road changing their location every moment, in order to make that information available for urgent inquiries or emergency contacts, prediction of arrival times, or preparation of daily reports.

The present invention intends to solve the above problems by having on-the-road members and customers carry a GPS-equipped portable telephone (a portable telephone equipped with GPS function) capable of determining their current location and by making an administrative server inquire of a desired GPS-equipped portable telephone about its current location and manage the acquired positional information.

The present invention can have the following features.

A location management method according to the present invention manages the location of a GPS-equipped portable telephone carried by a member, by inquiring of the GPS-equipped portable telephone about its current location, making the GPS-equipped portable telephone return positional information of the current location measured by the GPS function, managing the returned positional information of the current location in a file, searching a map database based on the positional information of the current location, and preparing and displaying map data linked with the positional information of the current location.

Also, preferably, the location management method of the present invention analyzes the movements of the members and creates activity log data, based on the positional information of current locations managed in the file.

Also, preferably, the location management method of the present invention creates daily reports of the members based on the activity log data.

Also, preferably, a location management method of the present invention manages the location of a GPS-equipped portable telephone carried by a member, by measuring current location of the GPS-equipped portable telephone of the member by its GPS function, sending positional information of the measured current location from the GPS-equipped portable telephone to an administrative server, managing server the received positional information of the current location in a file at the administrative server, searching a map database based on the positional information of the current location, and preparing and displaying map data which is linked with the positional information of the current location.

Also, preferably, in the location management method of the present invention, the administrative server analyzes the movements of the members and creates and manages travel path data, based on the positional information of current locations managed in the file.

Also, preferably, in the location management method of the present invention, the members are delivery people, and the administrative server estimates the arrival at the destination of delivery, based on the travel path data as well as on delivery planning data prepared in advance.

Also, preferably, in the location management method of the present invention, an arrival time inquiry menu is provided on terminals of customers, and the administrative server inquires of the GPS-equipped portable telephone carried by a delivery person about its current location in response to an arrival time inquiry request from a customer's terminal, searches a map database and retrieves map data corresponding to the current location based on returned positional information of the current location, and determines an estimated arrival time by calculating the time required from the current location to the delivery destination, and informs the customer's terminal about the estimated arrival time.

Also, preferably, a location management apparatus of the present invention manages the location of a GPS-equipped portable telephone carried by a member. The apparatus comprises inquiry means for inquiring of the GPS-equipped portable telephone about its current location, positional information management means for managing positional information of the current location returned from the GPS-equipped portable telephone, map database search means for searching a map database based on the returned positional information of the current location and linking the positional information of the current location with map information, and display means for displaying the map information linked with the positional information of the current location.

Also, preferably, the location management apparatus of the present invention comprises activity log creation means for analyzing the movements of the members and creating activity log data, based on the positional information of current locations managed in a file.

Also, preferably, the location management apparatus of the present invention comprises daily report creation means for creating daily reports of the members based on the activity log data.

Also, preferably, a location management apparatus of the present invention manages the location of a GPS-equipped portable telephone carried by a member. The apparatus comprises positional information management means for receiving, from the GPS-equipped portable telephone, positional information of the current location measured by the GPS function and managing the positional information in a file, map data preparation means for searching a map database based on the positional information of the current location and preparing map data linked with the positional information of the current location, and display means for displaying the map data.

Also, preferably, the location management apparatus of the present invention comprises travel path creation means for analyzing the movements of the members and creating travel path data, based on the positional information of current locations managed in the file.

Also, preferably, in the location management apparatus of the present invention, the location management apparatus comprises delivery management means for estimating the arrival at the destination of delivery, based on the travel path data as well as on delivery planning data prepared in advance, and the members are delivery people.

Also, preferably, the location management apparatus of the present invention comprises current location inquiry means for inquiring of the GPS-equipped portable telephone carried by a delivery person about its current location in response to an arrival time inquiry request from a customer's terminal, map data preparation means for searching a map database and retrieving map data corresponding to the current location based on returned positional information of the current location, and delivery time calculation means for determining an estimated arrival time by calculating the time required from the current location to the delivery destination.

Also, preferably, in the location management apparatus of the present invention the GPS-equipped portable telephone comprises a function to measure its current location and provide resulting positional information to the inquirer in response to an inquiry about its current location.

DETAILED DESCRIPTION OF THE PREFERRED EMBODIMENTS

Figure 1:
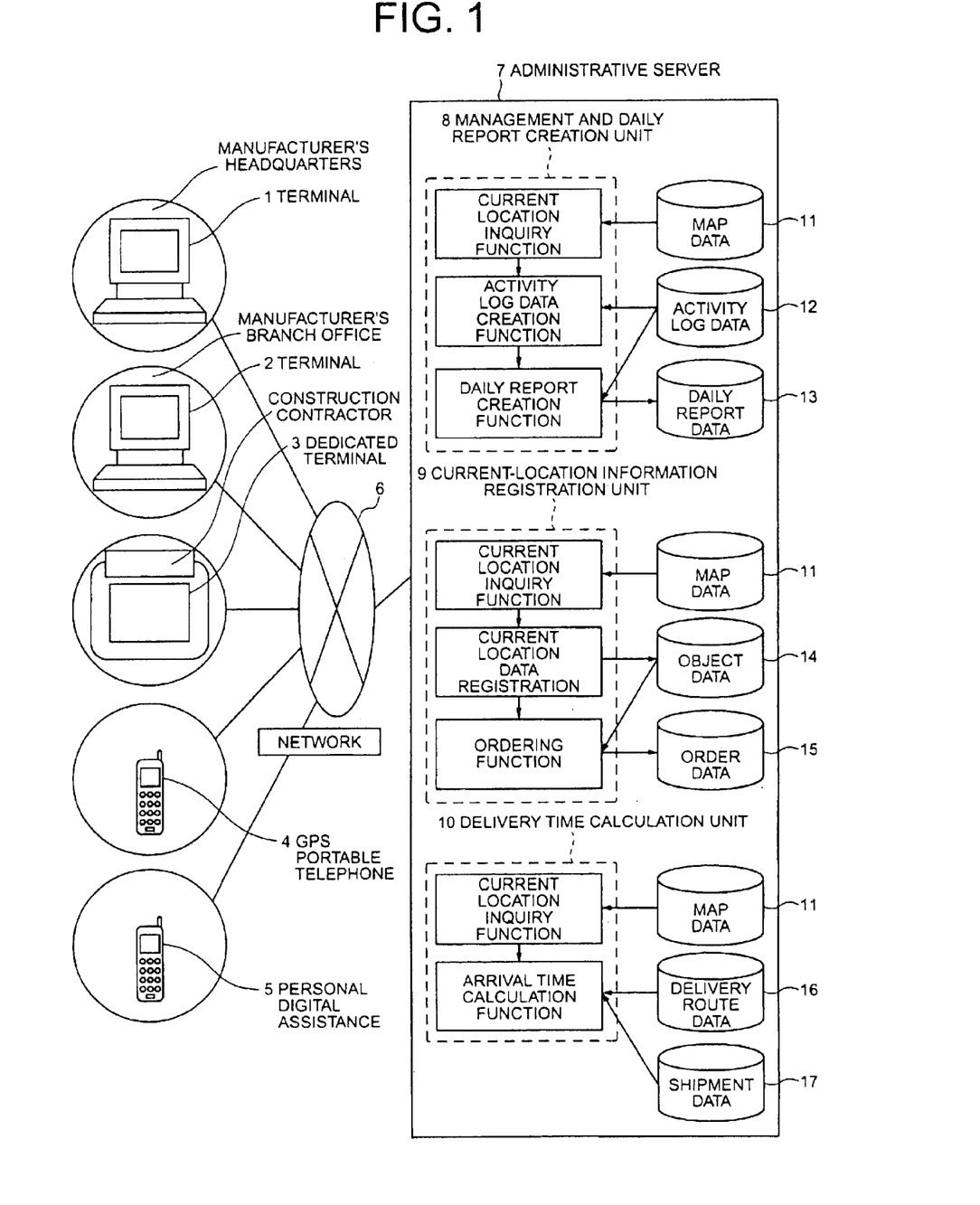
FIG. 1 is a system block diagram illustrating the principle of the present invention.

FIG. 1 is a system block diagram illustrating the principle of a location management system according to the present invention in an exemplary manner.

The system example shown in FIG. 1 is built to link with a product ordering system of a manufacturer which handles materials such as building materials. The product ordering system provides automatic quoting, order processing, customer management, delivery management, and other functions online. The location management system can use order data, delivery periods, delivery addresses, and other information contained in the product ordering system.

The location management system shown in FIG. 1 uses GPS-equipped portable telephones 4 to acquire, manage, and utilize information about current locations of certain members including on-the-road members such as customer service (CS) people, sales people, and delivery people and specific customers such as construction contractors. In FIG. 1, a terminal 1 is provided at the headquarters of a manufacturer, a terminal 2 is provided at a branch office of the manufacturer, a terminal dedicated to the manufacturer 3 is provided at a construction contractor that is a customer, a GPS-equipped portable telephone 4 is carried by on-the-road employees of the manufacturer as well as by specific customers such as construction contractors, a portable terminal 5 is carried by general customers, an administrative (or management) server 7 is provided in the manufacturer, and a network 6 interconnects these each other and has a management and daily report creation section 8, a current-location information registration section 9, and a delivery time calculation section 10.

The administrative server 7 may be build as software linked with a home page which can be accessed on the Internet by any terminal or portable telephone.

The management and daily report creation section 8 manages the activities of on-the-road members and automatically creates daily reports. It inquires of the GPS-equipped portable telephones 4 carried by on-the-road members about their current locations, for example, at fixed times or as required, by using a current location inquiry function. Alternatively, it makes customer service (CS) people or sales people carrying a GPS-equipped portable telephone 4 activate the GPS function, measure the latitude and longitude of their current locations, and send resulting location information to the administrative server 7. Each time location information is received, the management and daily report creation section 8 of the administrative server 7 searches a map database 11, based on the location information, converts the latitude and longitude contained in the location information into map data in a corresponding administrative division, and saves the map data in a file in chronological order. Then, using an activity log creation function, the management and daily report creation section 8 analyzes the time series data of the day's location information, determines the periods and locations corresponding to travels and halts, and creates the day's activity log data (file) 12. Then, based on the activity log data 12, a daily report is created by a daily report creation function and saved in a daily report data file 13.

The current-location information registration section 9 registers the name of a building for use by a construction contractor, i.e., a customer when ordering building materials at a building site as well as positional information of a delivery site, i.e., the current location. For that, the current location inquiry function inquires of the GPS-equipped portable telephone 4 carried by the customer about the current location. When the latitude and longitude of the current location is returned as location information from the GPS-equipped portable telephone 4, the map database 11 is searched, based on the location information, the latitude and longitude are converted into map data in a corresponding administrative division, and the map data is saved in an object file 14. Then, when the customer wishes to order products, an ordering function is used to perform quotation processing. When a definite order is placed, it is saved in an order data file 15.

If an inquiry about the arrival time of a delivery truck is made by a construction contractor who is receiving the delivered goods or by a sales person, the delivery time calculation section 10 calculates estimated arrival time based on the current location of the delivery truck and location of the delivery site, and replies to the inquirer. For that, the current location inquiry function inquires of the GPS-equipped portable telephone 4 carried by the delivery person driving the delivery truck about the current location. When location information about the current location of the delivery truck is returned from the GPS-equipped portable telephone 4, it is converted into map data in the map database 11. Then the location of the delivery site is determined based on a shipment data file 17, basic data about traffic conditions and necessary time are extracted from delivery route data 16, the estimated arrival time at the delivery site is calculated, and an answer is provided.

A preferred embodiment of the present invention will be described in concrete terms below.

Figure 2:
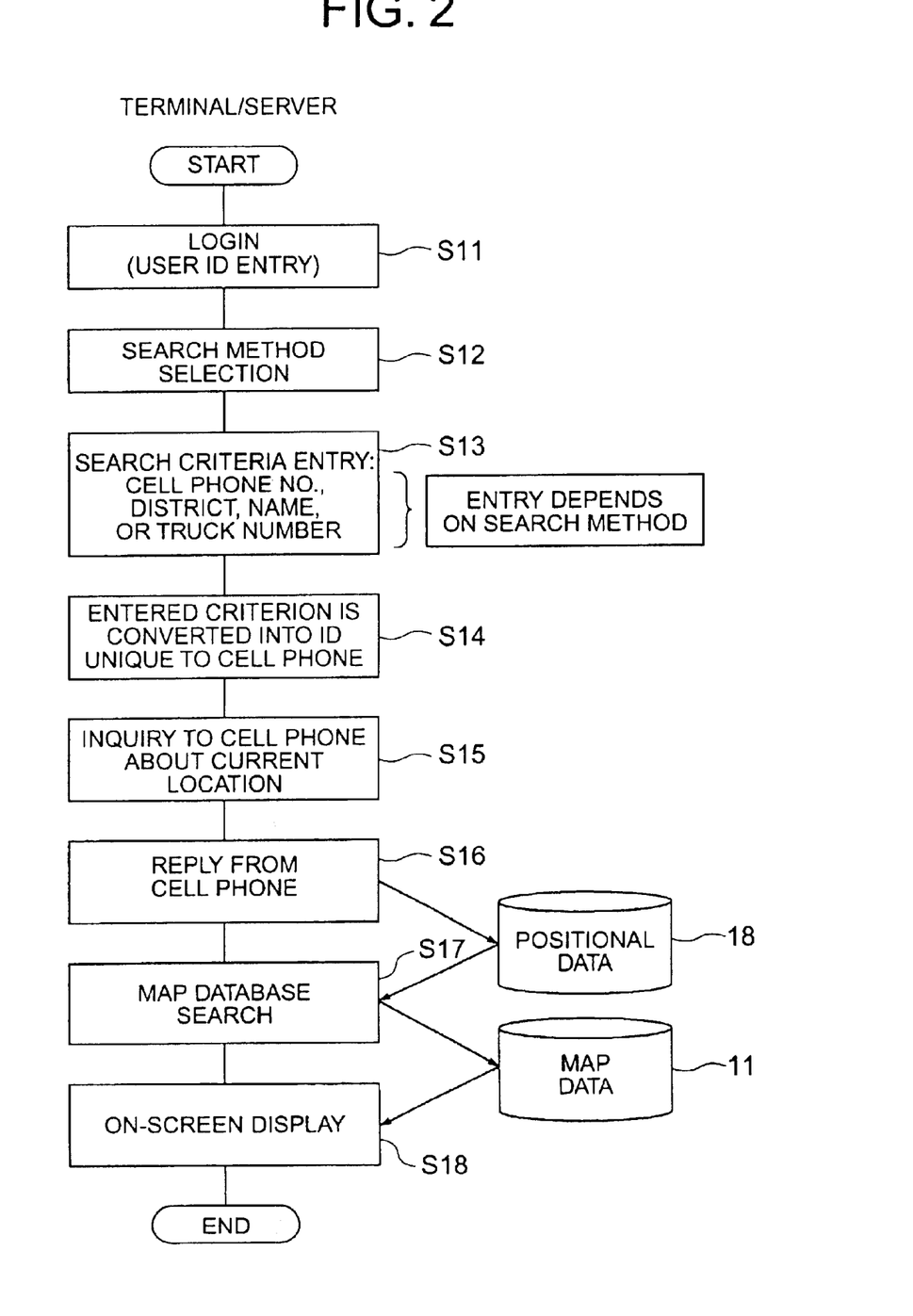
FIG. 2 is a flow chart of current location inquiry processing.

FIG. 2 is a process flow chart of the current location inquiry function in the administrative server 7.

To use this function, the user should enter his/her user ID on a Login screen and have it authenticated (Step S11). Then the user selects a search method from a menu to specify how to inquire current locations (Step S12). For example, the user can select how to specify current locations: by telephone number of the portable telephone, by district, by name, or by car number of the truck. When a search method is decided, the user enters a criterion for the search method (Step S13). For example, when using a name, the user enters the name of the member (employee on the road or customer) the inquiry will be addressed to. The system converts the name entered by the user into a subscriber ID (subscriber number) of a portable telephone by using a conversion table (Step S14). Then, the system connects to the GPS-equipped portable telephone 4 on the other end by dialing the subscriber ID and inquires about the current location (Step S15). In response to the inquiry, the GPS-equipped portable telephone 4 on the other end activates the GPS function, measures the current location, and returns resulting positional information (Step S16).

The current location inquiry function of the administrative server 7 manages the returned positional information in a file 18, searches the map database 11 based on the positional information, retrieves map data of the appropriate area (Step S17), creates a map image with the current location of the other end marked, and displays it on a monitor screen (Step S18).

As the sales department or quality control department of the manufacturer inquires of the GPS-equipped portable telephone 4 carried by a CS person, sales person, or delivery person about its current location, using the current location inquiry function, the current location is displayed with a map image on the monitor, making it possible to view the current location at a glance.

Figure 3:
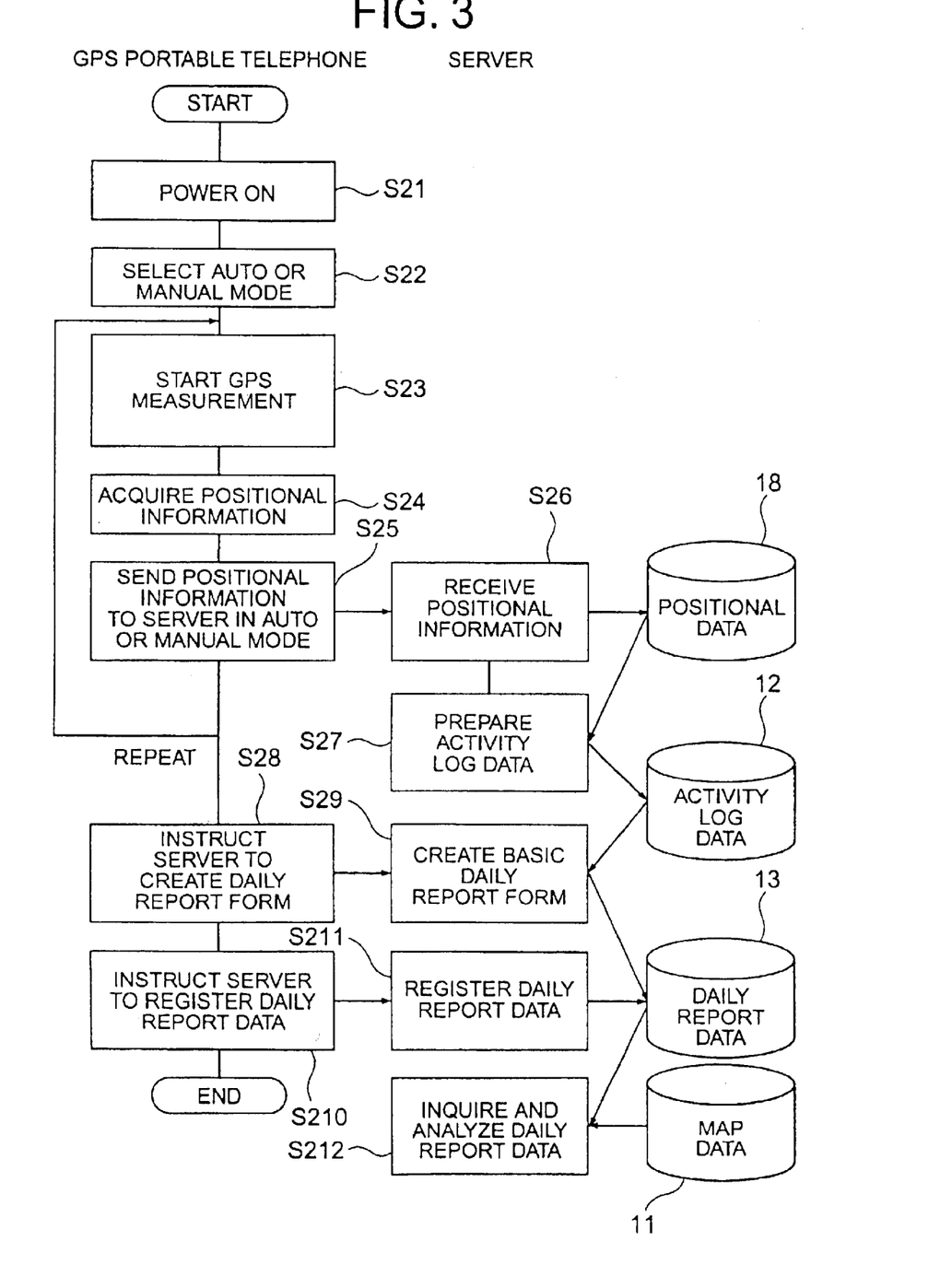
FIG. 3 is a process flow chart of activity log creation and daily report creation.

FIG. 3 is a process flow chart of the activity log creation function and daily report creation function in the administrative server 7.

A member such as a customer service (CS) person or sales person takes GPS measurements when starting a travel, when ending a travel, and when changing his/her destination, or as required, and sends the positional information of the current location to the administrative server 7. Specifically, the member turns on the GPS-equipped portable telephone 4 (Step S21), then specifies how to send the results of the GPS measurements—automatically or manually—by using Auto/Manual mode selection (Step S22). Then the member activates the GPS function to start measurement (Step S23). When positional information is obtained (Step S24), it is sent to the administrative server 7 in either the Auto or Manual mode whichever has been selected (Step S25). Upon receiving the positional information, the administrative server 7 saves it in a positional data file 18 in chronological order (Step S26).

The activity log creation function reads positional information in sequence from the positional data file 18, analyzes the continuity and temporal changes of locations, etc., prepares activity log data 12, and saves it in the activity log data file 12 (Step S27).

At the end of a day's work, the customer service (CS) person or sales person who carries the GPS-equipped portable telephone 4, invokes the daily report creation function of the administrative server 7 from the portable telephone, and instructs it to create a daily report form (Step S28). In response to the instruction, the daily report creation function creates a basic form based on the activity log data 12, and saves it in the daily report data file 13 when its content is confirmed (Step S29). When instructed to register the daily report data (Step S210), the daily report creation function registers the daily report data 13 according to the instruction, and manages it as information which can be searched and inquired (Step S211). If the registered daily report data 13 is linked with the map database 11, activity patterns can be displayed as an image on a map.

As the day's activity log and corresponding temporal data of the CS person or sales person are recorded, it becomes possible to analyze and manage his/her activities (Step 212). Furthermore, based on the activity log and temporal data of a CS person or sales person, time chart data can be generated automatically by taking into consideration working hours in the case of the CS person, and visiting hours or travel time as well in the case of the sales person. This time chart data makes it possible to create an accurate daily report sheet on a WEB screen, with reference to which supplemental entries can be made by using WEB capabilities of a portable telephone. Consequently, daily input of daily reports can be simplified (Step S212).

Figure 4:
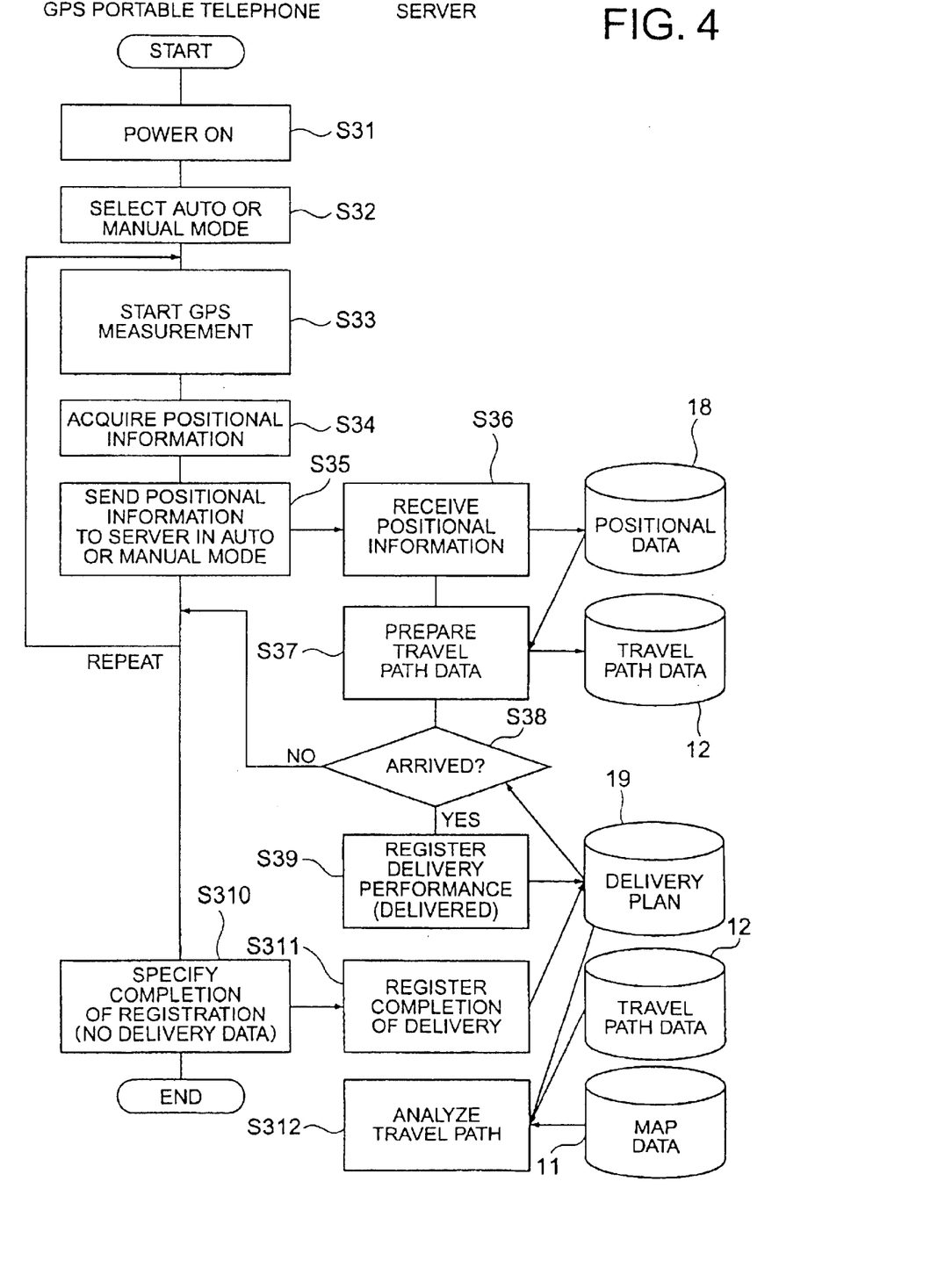
FIG. 4 is a process flow chart of location management of a delivery truck.

FIG. 4 is a process flow chart of location management of a delivery truck in the administrative server 7.

At each point during a travel of a delivery truck, the delivery person takes GPS measurements, sends positional information of the current location to the administrative server 7 for the latter to create a travel path and check how a delivery plan 19 is being carried out. Specifically, the delivery person turns on the GPS-equipped portable telephone 4 (Step S31) and specifies how to send the results of the GPS measurements to the administrative server 7—automatically or manually—by using Auto/Manual mode selection (Step S32). Then the delivery person activates the GPS function to start measurement (Step S33). When positional information is acquired (Step S34), it is sent to the administrative server 7 in either the Auto or Manual mode whichever has been selected (Step S35). Upon receiving the positional information, the administrative server 7 saves it in a positional data file 18 in chronological order (Step S36), creates a travel path of the delivery truck based on the received information, and saves it in a travel path data file 12 (Step S37).

The delivery truck moves around from one delivery destination to another according to the delivery plan 19 prepared in advance, but there is no way to check whether it actually arrived at a particular delivery destination and made a delivery because the administrative server 7 does not receive notification. Therefore, the administrative server 7 determines the linear distances between the progressive locations in the travel path obtained by the GPS measurements and the locations of the delivery destinations in the delivery plan 19 and checks whether the distances are below a certain threshold (Step S38). When a distance falls below the certain threshold, the administrative server 7 judges that the delivery truck has arrived at the given delivery destination and registers delivery performance (delivered) in the delivery plan 19 (Step S39). If the administrative server 7 cannot judge whether the delivery truck has arrived at the delivery destination, it ends the process by registering the delivery as completed (no delivery data) (Step S311) when instructed to register completion (Step S310).

As the day's activity log and corresponding temporal data of the delivery truck etc. are recorded in the delivery plan 19, travel path data file 12 and map database 11, it becomes possible to analyze and manage its activities (Step S312).

Figure 5:
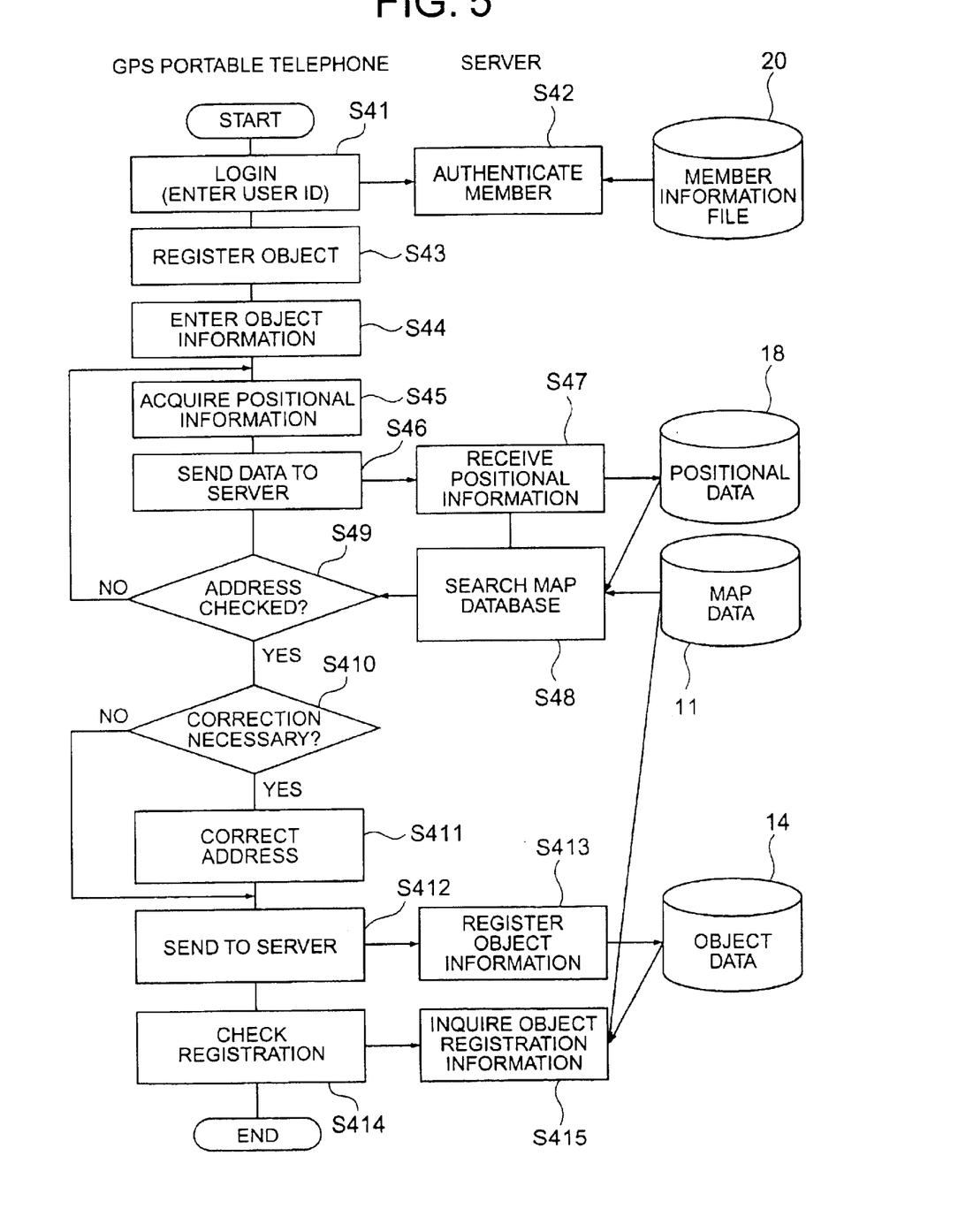
FIG. 5 is a flow chart of registration processing of an object.

FIG. 5 is a flow chart of on-site registration processing of a building in the administrative server 7.

A customer at a building site enters his/her user ID on the Login screen using the GPS-equipped portable telephone 4 (Step S41) and have it authenticated by the administrative server 7 provided with a member information file 20 (Step S42). Then, the customer selects Site Registration from a menu screen (Step S43), opens an Object Information Entry screen, and enters object information such as an object name (object data 14 hereinafter) (Step S44). Then, the customer activates the GPS function and acquires positional information of the site (Step S45). The acquired positional information is sent to the administrative server 7 (Step S46). The administrative server 7 saves the received positional information of the site in the positional data file 18 (Step S47). Then, it searches the map database 11 for corresponding map data, retrieves address data in an administrative division, and registers it as object information in the object data file 14. When the registration is completed, the administrative server 7 finishes the process by displaying the results on the portable telephone of the customer (Step S48). The customer checks the displayed address (Step S49) to see whether it is necessary to correct the address (Step S410). If it is, the customer makes the necessary correction (Step S411). The corrected address is sent to the administrative server 7 (Step S412). The administrative server 7 registers the corrected address it received in the object data file 14 (Step S413).

In this way, by using the GPS-equipped portable telephone 4 on site, it is possible to determine an address from positional information and map information, and register data linked with the map information using the site name as a key. When placing an order, if the user instructs the system, through the GPS-equipped portable telephone 4 by using this data, to check the registration of the object information (Step S414), the administrative server 7 can invoke the address and map information using only the site name based from the map database and object data file 14 (Step S415).

Figure 6:
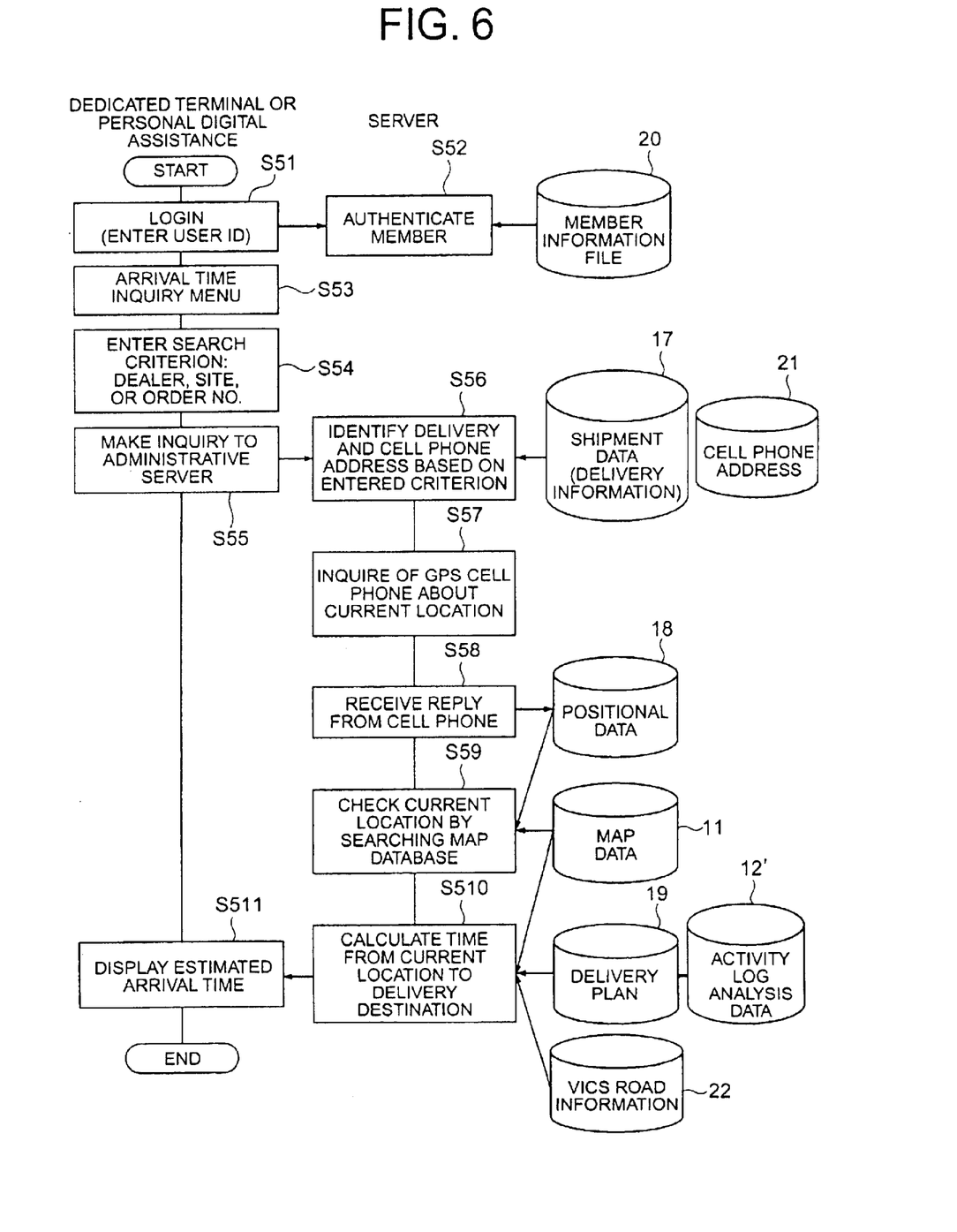
FIG. 6 is a flow chart of arrival time inquiry processing.

FIG. 6 is a process flow chart for inquiry about arrival time of a delivery truck.

If a customer, such as a construction contractor, who ordered products inquires of the administrative server 7 about the arrival time of the delivery truck, via a dedicated terminal or portable telephone on the day of delivery, the administrative server 7 gives an answer by estimating the time of arrival at the delivery site from the current location of the delivery truck.

The customer logs in from a dedicated terminal or portable telephone (Step S51) and have his/her membership authenticated by the administrative server 7, using the member information file 20 (Step S52). Then, the customer opens the menu screen and selects Delivery Time Inquiry (Step S53). Then, the customer enters a search criterion such as a dealer name, site name, or order No. to identify the goods to be delivered (Step S54), and inquires of the administrative server 7 about the arrival time (Step S55). Based on the search criterion entered and with reference to the shipment data 17, portable telephone address 21, etc., the administrative server 7 identifies the delivery relevant to the inquirer and the phone number of the GPS-equipped portable telephone 4 carried by the delivery person (Step S56) and inquires of the GPS-equipped portable telephone 4 about the current location (Step S57). When positional information 18 is returned as a result of position measurement by a portable telephone (Step S58), the administrative server 7 checks the current location on the map by searching the map database 11 based on the positional information 18 (Step S59). Then, the administrative server 7 calculates the delivery time required from the current location to the delivery destination, comprehensively considering route information contained in the delivery plan 19, information such as speed contained in activity log analysis data 12', VICS road information, and other factors, and returns the resulting estimated arrival time to the inquirer (Step S510). The inquirer displays the received results (Step S511).

Figure 7:
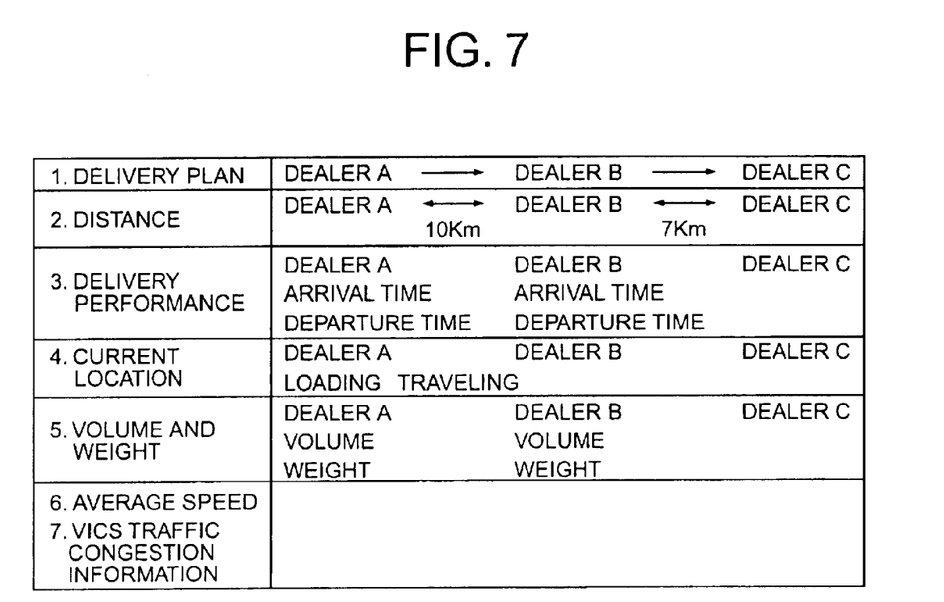
FIG. 7 is an example of computing elements for estimating arrival times.

FIG. 7 shows an example of computing elements for estimating arrival times.

The delivery plan 19 indicates a delivery sequence to delivery destinations such as dealer A, dealer B, and dealer C, etc., for that day. The distance, which indicates distances between successive delivery destinations, is calculated from the map database 11. The delivery performance is data about the actual arrival time and departure time at each delivery destination. The current location indicates where the delivery truck is located, or at what delivery destination or between what delivery destinations, and what it is doing. The volume and weight indicate the volume and weight of the goods unloaded at each delivery destination. The average speed is the actual average speed during delivery. The VICS traffic congestion information is used in conjunction with past analytical data to calculate a congestion rate, which then is used to correct time.

(1) To calculate the time (or arrival time) to a next delivery destination during travel:

Calculate the distance and time to the next delivery destination based on the positional information of the current location.

(Present time)+(Time to the next delivery destination)

(2) To calculate the time (or arrival time) to a delivery destination after next during travel:

(Present time)+(Time to the next delivery destination)+(Unloading time)+(Total estimated time to specified delivery destination)

(3) To calculate the time (or arrival time) to the next delivery destination during unloading:

(Estimated remaining unloading time [that is, (Estimated time)−((Present time)−(Arrival time))])+(Total estimated time to specified delivery destination)

Now, concrete examples of operating screens of the system and their flow chart will be described with reference to FIGS. 8 to 10.

Figure 8:
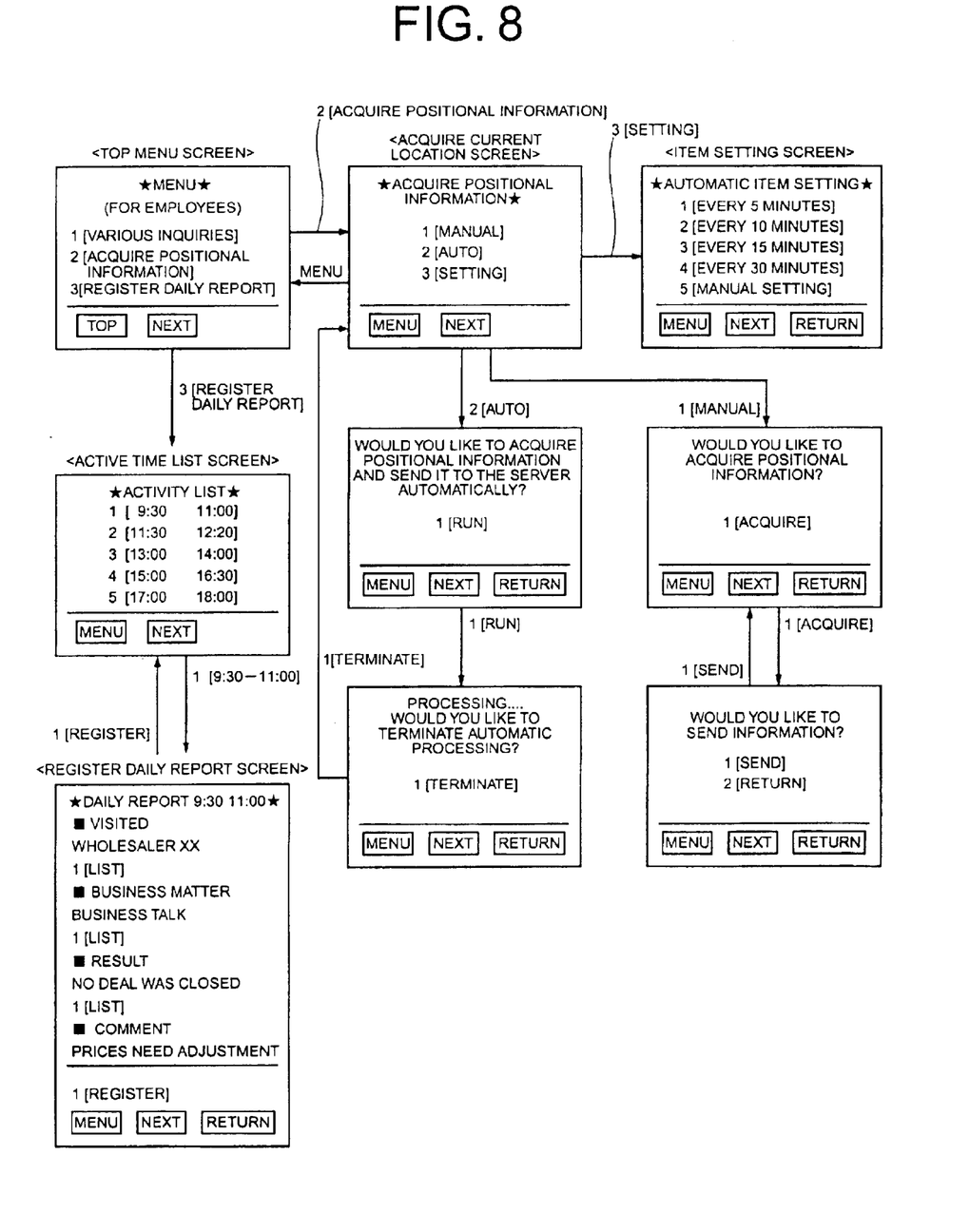
FIG. 8 is a diagram illustrating the flow of activity log and daily report registration screens.

FIG. 8 shows a flow of operating screens on the GPS-equipped portable telephone 4 when creating an activity log of a CS person or sales person and registering his/her daily report. Top Menu Screen for creating activity histories and registering daily reports allows the user to select among "Various inquiries," "Acquire positional information," and "Register daily report." If the user selects "Acquire positional information," Acquire Current Location Screen opens and displays menu items—"Manual," "Auto," and "Setting"—to allow the user to select a method for acquiring positional information. If the user selects "Manual," message screens will appear, asking the user to confirm acquisition of positional information by the GPS function and transmission of the acquired positional information to the server, respectively. If the user selects "Auto," positional information will be acquired and sent to the server in one operation automatically. If the user selects "Setting" on the Acquire Current Location Screen, Item Setting Screen opens, allowing the user to specify any time interval between the automatic acquisition and transmission of positional information.

Incidentally, instead of setting conditions and executing automatic acquisition and transmission of positional information on the portable telephone, it is also possible to configure the portable telephone to execute automatic acquisition and transmission of positional information by answering a call from the administrative server 7 automatically.

If the user selects "Register daily report" on the Top Menu Screen, Active Time List Screen opens and displays non-travel periods as an activity list, based on the day's activity log of the user. The user selects a period he/she wants to enter in the daily report from the list, opens Register Daily Report Screen, and enters and registers details of an activity. The user repeats this operation to complete the daily report data 13.

Figure 9:
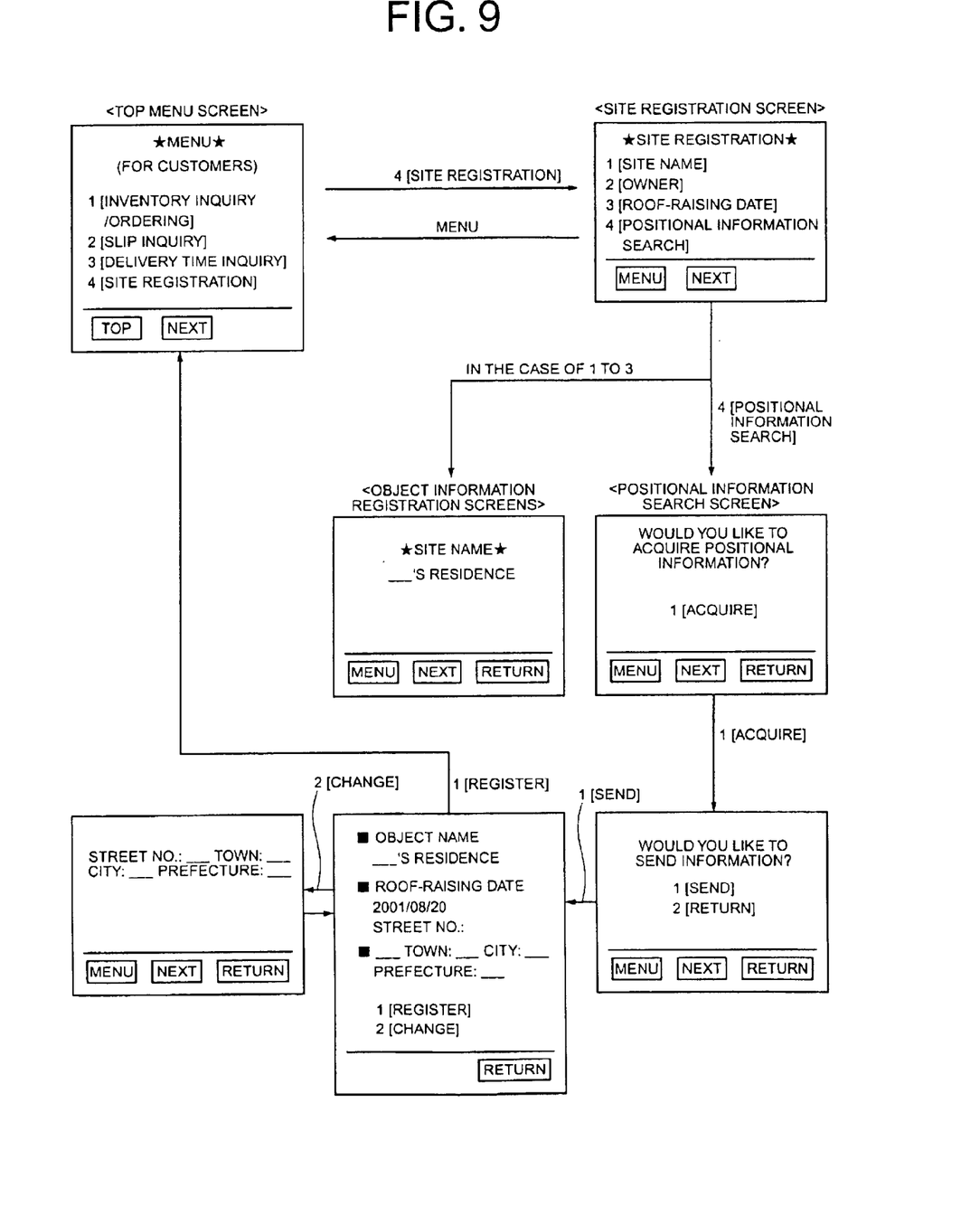
FIG. 9 is a diagram illustrating the flow of object (current location) registration screens.

FIG. 9 shows a flow of operating screens for object registration processing on the GPS-equipped portable telephone 4 of a customer.

The Top Menu Screen for this processing allows the user to select among "Inventory inquiry/ordering," "Slip inquiry," "Delivery time inquiry," and "Site registration." Selecting "Site registration" opens Site Registration Screen allowing the user to select among "Site name," "Owner," "Roof-raising date," and "Positional information search." Regarding "Site name," "Owner," and "Roof-raising date," the user opens and fills in respective Object Information Registration Screens. Then, the user opens Positional Information Search Screen by selecting "Positional information search," gives an instruction to acquire positional information, and specifies transmission by selecting "Send" in response to a confirmation message. Then, the "Site name," "Owner," and "Roof-raising date" data entered as well as the positional information acquired are sent to the administrative server 7.

The administrative server 7 converts the received positional information into address display by searching the map database 11, edits the site registration information together with other input data, and outputs the resulting data to the portable telephone of the customer to display it on screen. The customer enters corrections if there is any mistake in the displayed address or other data, or ends the process by specifying registration if there is no problem.

Figure 10:
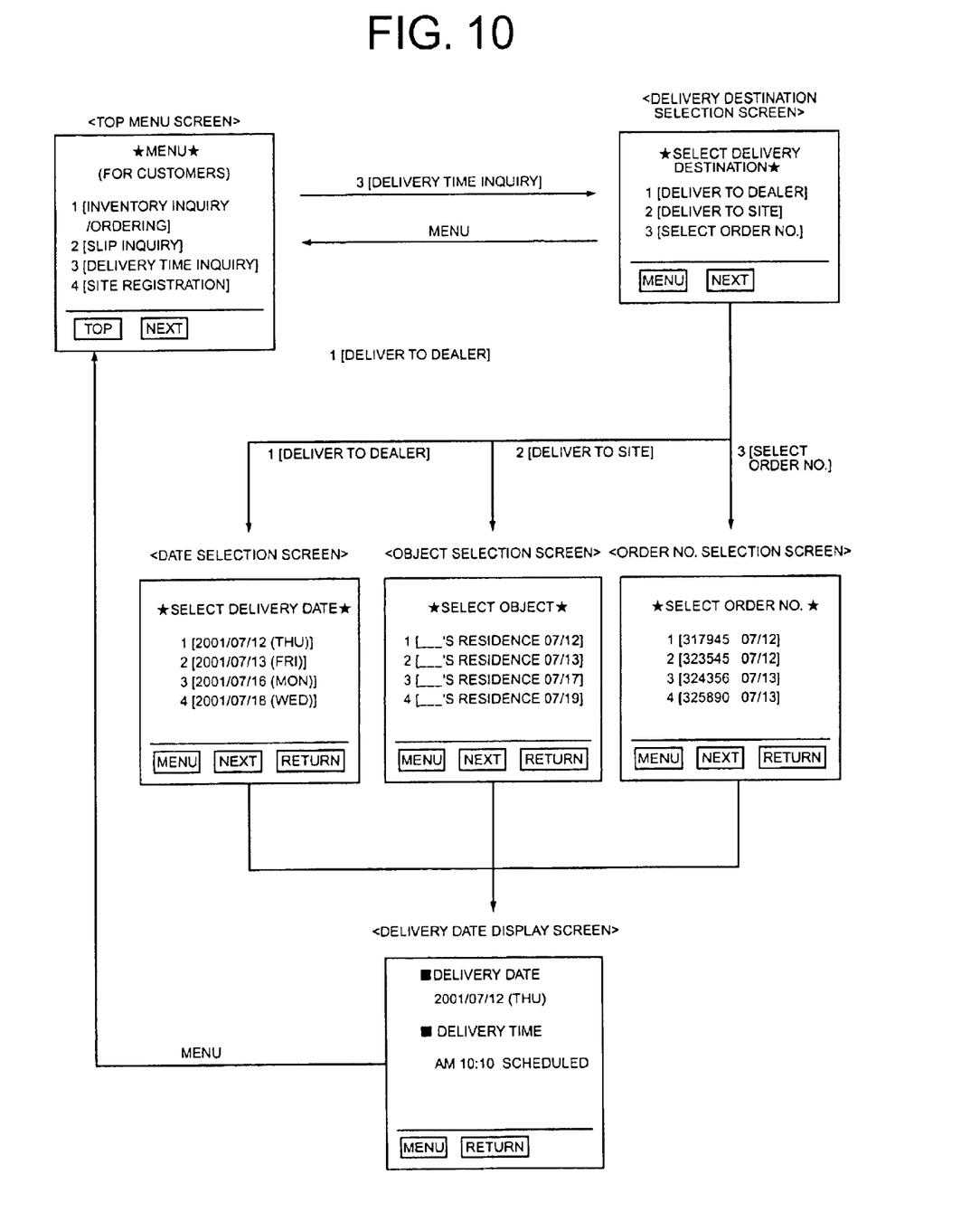
FIG. 10 is a diagram illustrating the flow of a delivery time display/operating screens.

FIG. 10 shows a flow of operating screens for delivery time inquiry processing on a dedicated terminal or portable telephone of a customer.

The Top Menu Screen for this processing is the same as that in FIG. 9. When the customer selects "Delivery time inquiry," Delivery Destination Selection Screen opens and displays "Deliver to dealer," "Deliver to site," and "Select order No." as selection criteria. If the customer selects "Deliver to dealer," Date Selection Screen opens and lists the delivery dates available for the customer. If the customer selects a desired date, the administrative server 7 estimates the arrival time of the delivery for that day, determines the delivery time from the resulting estimated arrival time, and displays it on Delivery Date Display Screen. If the customer selects "Deliver to site," the objects relevant to the customer are listed on Object Selection Screen. As the customer selects a desired object on this screen, the appropriate delivery is identified, the arrival time is estimated, and the delivery time is similarly displayed on the Delivery Date Display Screen. Similarly, by choosing "Select order No." and then selecting an order No. on Order No. Selection Screen, the customer can make the appropriate delivery to be identified and the arrival time to be displayed.

Figure 11A:
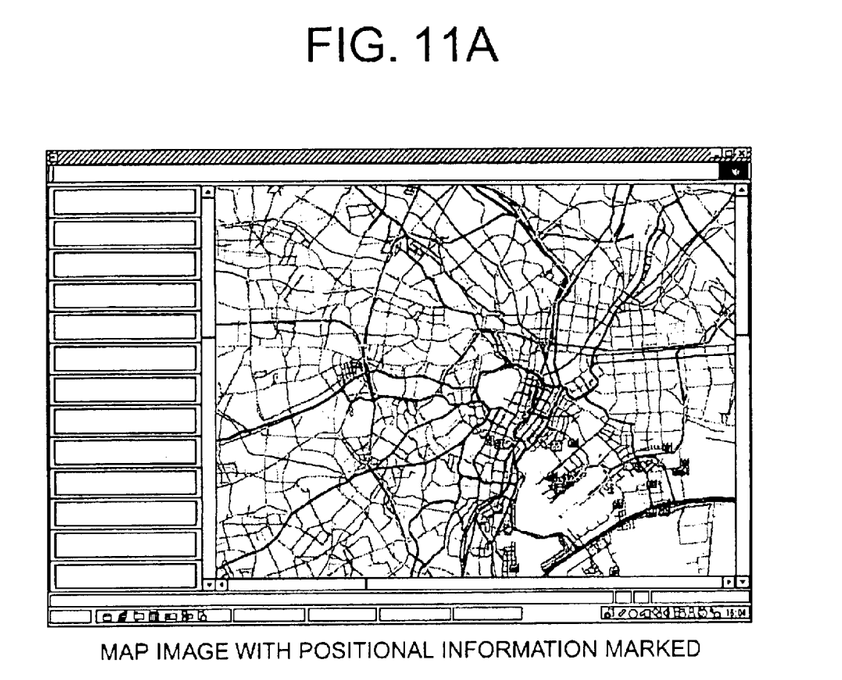
FIGS. 11A and 11B are diagrams illustrating display examples of positional information and activity logs.
Figure 11B:
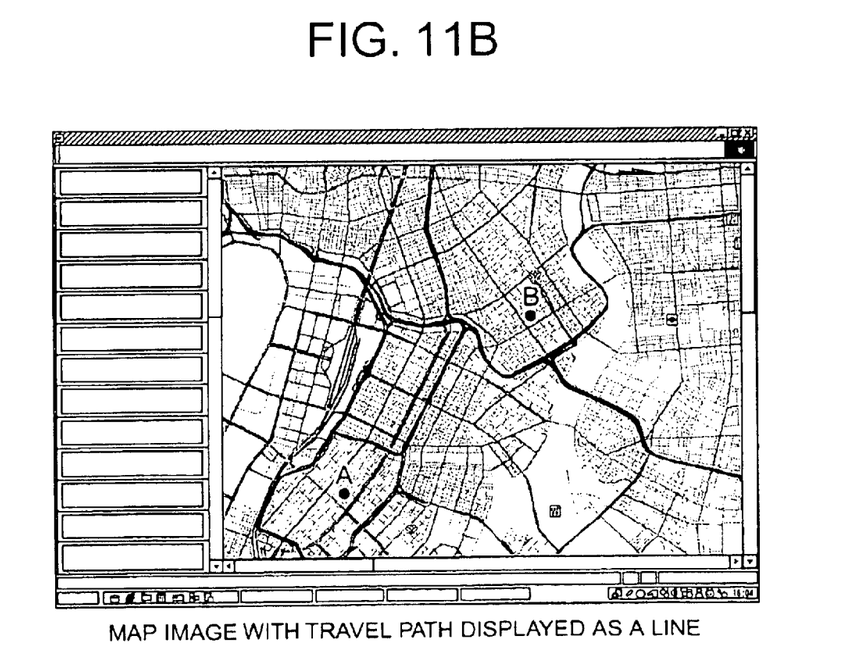

FIG. 11 shows sample images which are displayed by linking positional information of current locations acquired from the GPS-equipped portable telephone 4 with the map database 11. FIG. 11A shows an example in which a current location is marked while FIG. 11B shows a sample image in which the locus of current locations are displayed as a line.

The present invention makes it possible to acquire the current locations of CS people, sales people, or delivery trucks, as required, by using the GPS-equipped portable telephones 4. Consequently, a day's activity log and corresponding temporal data can be gathered and recorded accurately, which makes it possible to analyze and manage their activities objectively. Also, by using the same data, daily reports can be created easily, alleviating the burden of creating daily reports and making it possible to submit them as required.

Also, the present invention simplifies the process of entering objects at a site when placing an order. This speeds up order processing, improves its efficiency, and eases the burden on customers.

Also, in response to inquiries about arrival times during deliveries, the present invention can estimate and present arrival times more accurately than is possible conventionally.

What is claimed is:

1. A location management apparatus for managing a location of a GPS-equipped portable telephone carried by a mobile worker, the apparatus comprising:

an inquiry means for inquiring of the GPS-equipped portable telephone about its current location;

a positional information management means for managing positional information of said current location returned from the GPS-equipped portable telephone;

a map database search means for searching a map database based on returned positional information of said current location and converting said positional information of said current location into a map data in a corresponding administrative division;

a saving means for saving said converted map data in time series order in a first file;

an analyzing means for analyzing said converted map data in time series order of one day for the mobile worker and creating activity log data of said day for the mobile worker;

a daily report creating means for creating a daily report of said day for the mobile worker based on said activity ba data and storing said daily report in a second file; and a delivery time calculation means for inquiring of the GPS-equipped portable telephone carried by the mobile worker about its current location by said inquiry means in response to an arrival time inquiry request from a customer's terminal, searching a map database and retrieving map data corresponding to the current location based on returned positional information of said current location by said map database search means, and determining an estimated arrival time by calculating the time required from said current location to a delivery destination, wherein said delivery time calculation means estimate arrival time to said delivery destination by calculating time to be needed from said current location of said mobile worker to said delivery destination, the time to be needed being calculated based on distance between said current location of said mobile worker and said delivery destination, volume and weight of goods unloaded at each of delivery destinations located between said current location of said mobile worker and said delivery destination, and actual average speed during delivery.

* * * * *